United States Patent [19]

Murray

[11] Patent Number: 5,094,285
[45] Date of Patent: Mar. 10, 1992

[54] TENSION RAFTER FOR AWNINGS

[75] Inventor: Brent Murray, El Toro, Calif.

[73] Assignee: The Dometic Corporation, Santa Ana, Calif.

[21] Appl. No.: 716,747

[22] Filed: Jun. 17, 1991

Related U.S. Application Data

[63] Continuation of Ser. No. 431,940, Nov. 6, 1989, abandoned.

[51] Int. Cl.$^5$ ............................................. E04F 10/06
[52] U.S. Cl. ........................................ 160/67; 160/46; 160/71
[58] Field of Search .................... 160/46, 55, 65, 66, 160/68, 69, 71, 72, 80, 67; 248/354.5, 357, 188.8, 188.9, 188.91

[56] References Cited

U.S. PATENT DOCUMENTS

| | | | |
|---|---|---|---|
| 3,800,484 | 4/1974 | Marshall | 248/354.5 X |
| 4,530,389 | 7/1985 | Quinn et al. | 160/299 X |
| 4,640,332 | 2/1987 | Turner | 160/46 |
| 4,658,877 | 4/1987 | Quinn | 160/46 |
| 4,727,897 | 3/1988 | Watts | 160/69 X |
| 4,759,396 | 7/1988 | Quinn | 160/66 |
| 4,801,119 | 1/1989 | Pelletier | 248/354.5 |
| 4,807,720 | 2/1989 | Kim | 248/188.8 |

Primary Examiner—David M. Purol
Assistant Examiner—Korie H. Chan
Attorney, Agent, or Firm—Pearne, Gordon, McCoy & Granger

[57] ABSTRACT

A tension rafter arrangement adapted to apply tension to an awning extending between a wall and an awning support comprises an extensible rafter having one end adapted to be pivoted at a wall. The rafter has a fitting for releasably holding it to the support. The pivoting arrangement enables pivoting of the rafter to a position so that the fitting is adjacent the wall. The fitting can be releasably held to the wall. The rafter has a tensioning arrangement with a mechanical advantage, and a link pivoting the rafter to the wall serves as a support to lift a stored awning. A roller support for the awning can rotate without affecting the tension of the awning.

9 Claims, 8 Drawing Sheets

TENSION RAFTER FOR AWNINGS

This is a continuation of application Ser. No. 07/431,940, filed Nov. 6, 1989, now abandoned.

This invention relates to a rafter for applying tension to an awning, and is more in particular directed to a tension rafter of this type adapted for use with the awning of a motor vehicle. It will be apparent, however that the tension rafter of the invention may also be employed advantageously for other applications, such as for awnings for nonvehicular structures, and such application must hence be considered to be within the scope of the invention.

BACKGROUND OF THE INVENTION

Awnings are frequently installed on recreational vehicles, such awnings being frequently comprised of a fabric material affixed to the side of the vehicle and extending outward to a roller tube. The ends of the roller tube are held by brackets or arms pivoted to the side of the vehicle, to permit the roller tube to be moved between a closed position at which it is rolled on the roller tube and stored against the vehicle, and to one or more open positions at which is spaced from the vehicle to permit the fabric to serve as an awning.

When the roller tube is very long, for example at least 18 feet long, and especially when it is longer than 22 feet, flexing of the roller tube permits the center of the awning to sag, even though the fabric at the ends of the awning is held taut by the support brackets at the end of the tube. In order to avoid such sagging, adjustable tension rafters may be provided to extend between the vehicle and one or more intermediate positions of the roller tube. Such tension rafters are disclosed, for example, in U.S. Pat. Nos. 4,640,332 and 4,801,119.

The flexibility of a long roller tube also permits the awning to sag when the awning is in the closed position, i.e. rolled up on the roller tube and pivoted to lie against the side of the vehicle. For example, a 25 foot awning may sag as much as 2½ inches at its center in this position. Such sagging is unsightly, and causes bouncing of the awning when the vehicle is moving. The bouncing distorts the fabric, and may result in a decrease in the life of the awning. It is therefore known to provide a support for the center of such an awning when it is in the closed position. Thus, U.S. Pat. No. 4,727,897 disclosed a structure dedicated to the support of the center of an awning only when it is in the closed position, and U.S. Pat. No. 4,801,119 discloses the use of the tension rafter, in an alternate position, for supporting the center of the awning during transport. In the arrangement of the latter reference, moving of the tension rafter to its alternate position requires separation of the rafter from its pivot coupling with the side of the vehicle, to abut the stored awning with the same cradle shaped rafter end that was used to abut the roller tube in the open position of the awning.

Typical pivot brackets for holding the ends of the roller tube include a rafter having one end pivoted to the side of the vehicle, and a main arm having one end releasably pivoted to the side of the vehicle below the rafter. The rafter and the arm are extensible, and their outer ends are pivotally held together generally at the axis of the roller tube. When the rafters and main arms are first pivoted away from the vehicle to move the awning from its closed position, the awning may assume a "neutral" position with the end rafters, as well as any central tension rafter, being sufficiently low that a person can easily adjust the lengths of these rafters to tension the fabric material. This position of the awning may be too low for practical use of the awning. The user may accordingly adjust the lengths of the main arms to raise the roller tube to a intermediate position at which normal living activities can occur under the awning. At this intermediate position the main brackets arms still extend between the roller arm and the side of the vehicle, thereby restricting passage at the ends of the awning. Accordingly, such awnings also have a higher "carport" position, attained by releasing the main arms from the vehicle and moving them to abut the ground immediately below the roller tube.

Movement of the awning between the various open positions has been found to affect the tension of the fabric such that, for example, a significant sag may appear at the center of the awning when it is moved to the carport position, even though it was adequately taut at the neutral position. This sagging results from the geometry of the awning structure, as well as movement or rotation of the roller tube when the height of the roller tube is changed. In the carport position the central tension rafter is generally too high to permit its length to the readily changed, so that it is frequently necessary to stand on a ladder to adjust the length of the rafter. This practice can be dangerous, especially to retired persons who frequently use mobile homes.

U.S. Patent application Ser. No. 216,835, Murray, filed Jul. 7, 1988 and assigned to the assignee of the present application, the contents of which are incorporated by reference herein, discloses an awning assembly wherein a fabric material extend between the vehicle and a roller, and is adapted to be wound on the roller in the closed position of the awning. Main arms are pivotally mounted to the ends of the roller, and are releasably held to the side of the vehicle. The lower ends of the main arms may thus be released from the vehicle to enable positioning of the awning in the carport position. Rafters are pivotally mounted to the vehicle. and are also pivotally coupled to the upper ends of the main arms. The pivotal coupling is configured to ensure that fabric is maintained taut when the awning is raised to its carport position, by shifting the position of the axis of the roller with respect to the ends of the rafters.

SUMMARY OF THE INVENTION

The invention is therefore directed to the provision of an improved tension rafter arrangement for an awning, for the side of a vehicle or the like.

Briefly stated, in accordance with one embodiment of the invention, a tension rafter arrangement adapted to apply tension to an awning extending between a wall and an awning support, comprises an extensible rafter, means for pivoting one end of the rafter to the wall, means for releasably holding the other end of the rafter to the support, the pivoting means enabling pivoting of the rafter to a position with the holding means adjacent the wall, and means for releasably holding the holding means to the wall.

In accordance with the invention, in order that the length of the tension rafter need not be changed to maintain the tautness of the fabric, it is pivoted as close as possible to the "pivot" line of the fabric, i.e. the locus about which the roller tube "pivots" as the awning is moved up and down.

While such placement of the pivot of the tension rafter would enable the tension rafter to generally maintain the tautness of the fabric, it would render difficult any usage of the tension rafter as a holding device for the awning in the closed position when the awning is in the closed position.

Therefore, in accordance with the invention, the inner end of the tension rafter is pivoted to the side of the vehicle via a link having a curved upper surface. With this arrangement, when the awning is rolled up, the lower end of the tension rafter can be attached to a bracket on the side of the vehicle, and the length of the tension rafter adjusted to snugly fit the curved surface of the link against the awning. The "jack" on the tension rafter can no be used to lift up the center of the awning to remove its sag. Without the jack it would be very difficult to lift the awning. The jack on the tension rafter thus serves to tension the fabric, as well as to enable lifting of the center of the awning for transport.

The mere provision of a link, while serving the function of simplifying the straightening of the stored awning, would, by itself, not enable the location of the pivot of the tension rafter to be close to that of the fabric. Therefore, in accordance with the invention, the permissible angular displacement between the link and the tension rafter is limited. Specifically, the tension arm can move angularly freely, with respect to the link, when the acute angle between the tension rafter and the side of the vehicle is less than the angle thereof at which the roller tube is in its "down", or "neutral" position. When the tension rafter has been raised to this angle, an abutment on the inner end of the tension rafter engages an abutment on the upper side of the link to inhibit an further relative angular displacement therebetween. Thus, as the angle of the tension rafter is increased beyond this limit, the link is held fixed with respect to the tension rafter, and the assembly of the link and the tension rafter now pivots about the inner pivot joint of the link. This latter pivot joint may be located relatively close to the pivot line of the fabric, so that the tension rafter maintains the tautness of the fabric substantially constant throughout the range of open positions of the awning.

A roller tube lock may be provided which, when set, inhibits relative rolling of the roller tube with respect to the end arm. Thus, when the lock is set, the hole for receiving the pin of the tension rafter changes its angular displacement with respect to the axis of the tension rafter as the end arm is moved between the position at which it is pivoted to the side of the vehicle, and the position at which is provides a ground support. As a consequence the roller tube will pivot about the upper projection of the end fitting of the tension rafter with the base of the pin being separated at various degrees from the surface of the roller tube. While this is not the preferred condition, the pin at the end of the tension rafter is sufficiently long that the tension rafter will remain firmly held to the roller tube. Since the distance between the projection of the tension rafter and the inner pivot thereof to the vehicle remains fixed, the tension on the fabric of the awning is maintained. If the lock is not set, however, the roller tube can roll in response to forces on the fabric material, such that its angular displacement with respect to the tension rafter will not change, whereby the fitting on the end of the tension rafter remains snugly fit at each position of the roller tube, and the fabric remains in tension at all positions of the roller tube.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
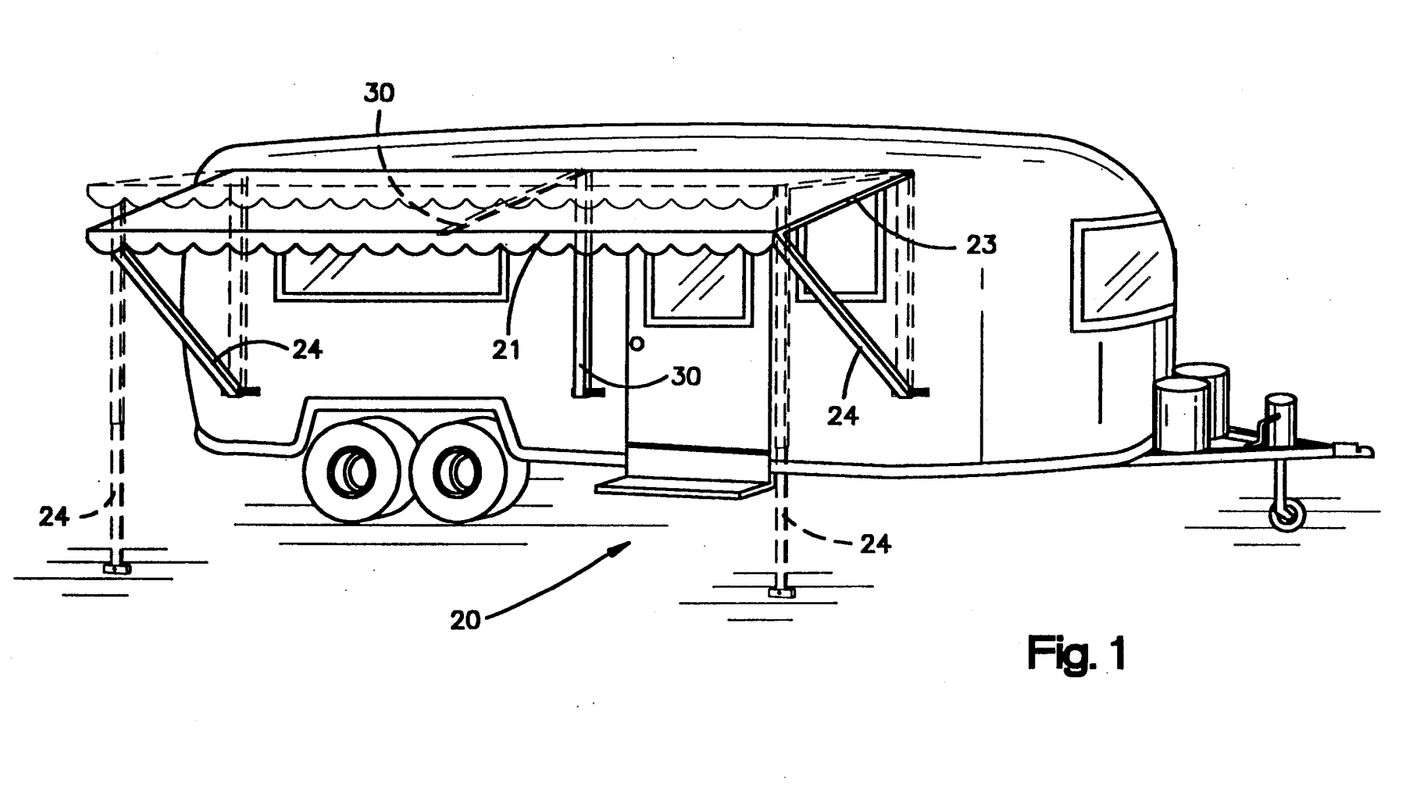
FIG. 1 is a perspective view of a recreational vehicle that may incorporate the tension rafter of the present invention.

Referring now to the drawings, and more in particular to FIG. 1, therein is illustrated a recreational vehicle 20 having an awning 21, that may incorporate the arrangements of the invention. One side of the awning is attached to the vehicle 20, and the other end is affixed to a roller 22 (See FIGS. 4–7). Each end of the roller is supported by an extensible end rafter 23 pivoted to the vehicle at a height as close as possible to the attachment line of the awning and the vehicle. Each end of the roller 22 is also supported by an extensible main arm 24 that is pivotally mounted to the vehicle at a position lower than the respective rafter.

The lengths of the rafters 23 may be adjusted in order to enable to apply sufficient force to the roller 22 that the ends of the awning do not sag. The lengths of the arms 24 may be adjusted in order to adjust the height of the roller, and hence the outward edge of the awning. Thus, FIG. 1 illustrates a lower position of the awning in solid lines, and a higher position thereof in dashed lines. When the awning is adjusted to a raised position, it is advantageous to release the arms 24 from their pivot connections to the vehicle, and align them vertically to serve as support legs, as illustrated in the dash-dot lines.

On occasion it is desirable to maintain the angular displacement of the roller 22 fixed with respect to the main arm 24, for example when the awning is rolled upon on the roller and stored against the vehicle. For this purpose, a catch or latch (not illustrated) may be provided in accordance with conventional practice.

As discussed above, when the roller is long, it is desirable to provide one or more intermediate or tension rafters 30 to prevent the center of awning from sagging. FIG. 1 illustrates the tension rafter 30 in dashed lines, when the awning is extended, and in solid lines, when it is stored against the side of the vehicle.

THE TENSION RAFTER IN THE STORAGE POSITION

Figure 2:
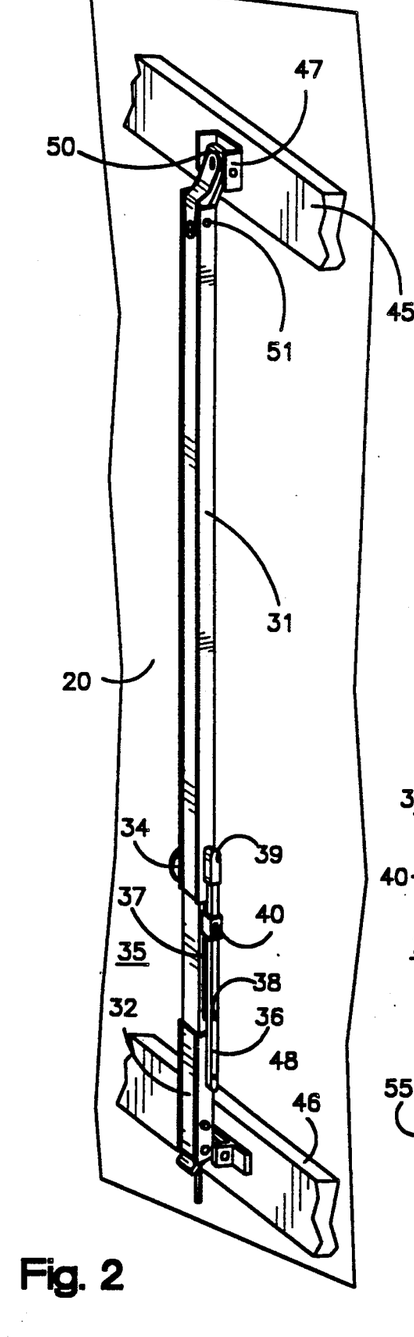
FIG. 2 is a perspective illustration of the tension rafter in a stored position against the side of a vehicle.
Figure 3:
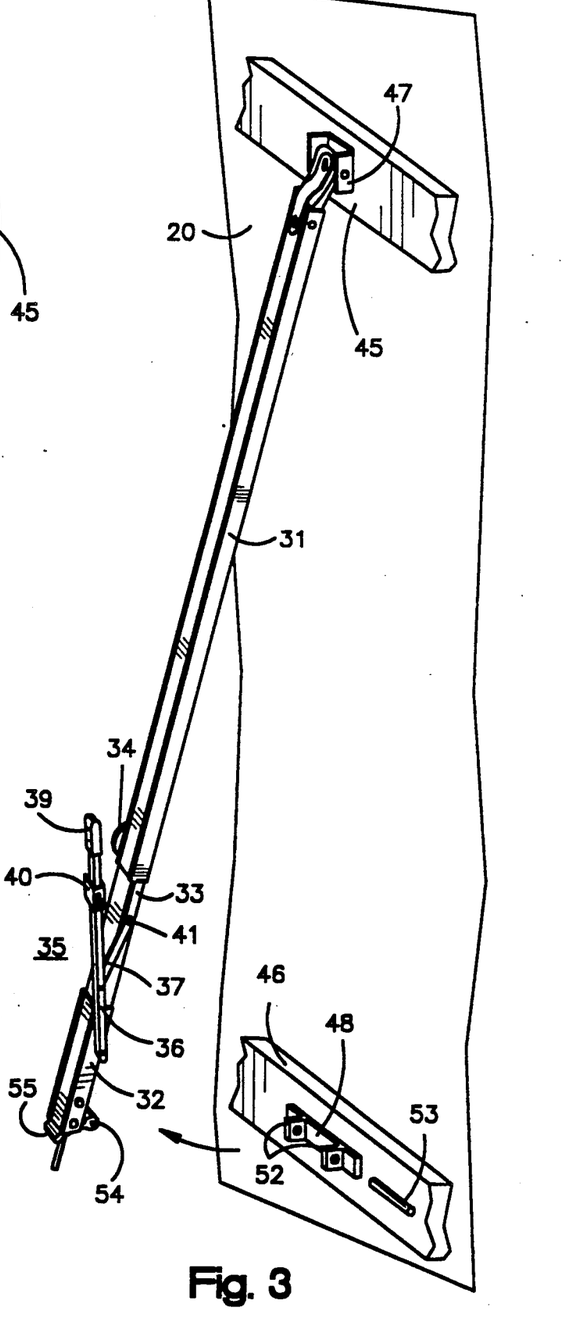
FIG. 3 is a perspective illustration of the tension rafter pivoted away from the side of the vehicle.

FIG. 2 illustrated the tension rafter 30 in stored position against the vehicle, prior to being extended to support the roller, and FIG. 3 illustrated the tension rafter 30 before its lower end is affixed to the vehicle. The tension rafter 30 includes an inner arm 31 having a channel shaped cross section, an outer arm 32 also having a channel shaped cross section, and a central arm 33 of channel shaped cross section and slidably received in the inner and outer arms 31, 32. The longitudinal position of the central arm with respect to the inner arm 31 may be held via a clamp 34, which will be subsequently described.

Figure 4:
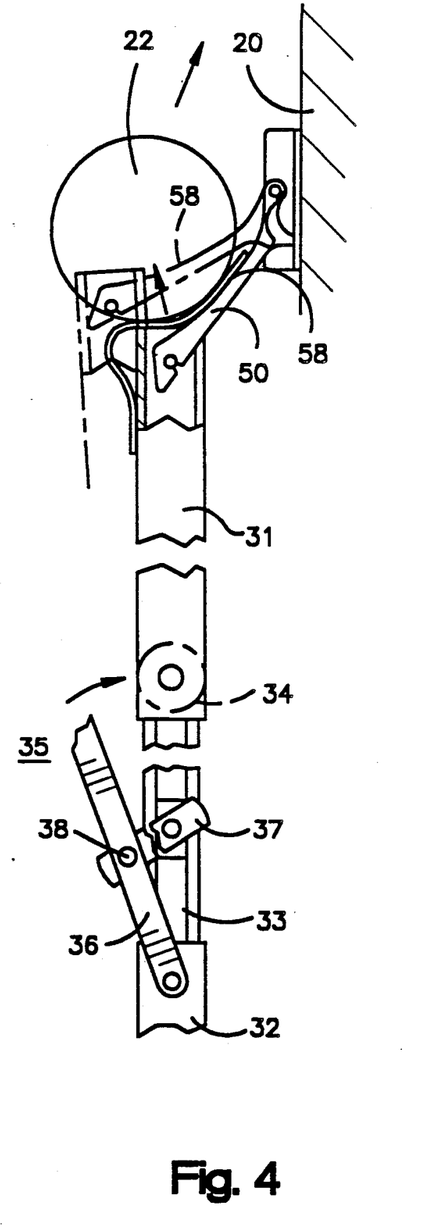
FIG. 4 is an enlarged side view showing a stored tension rafter in its lower position.
Figure 5:
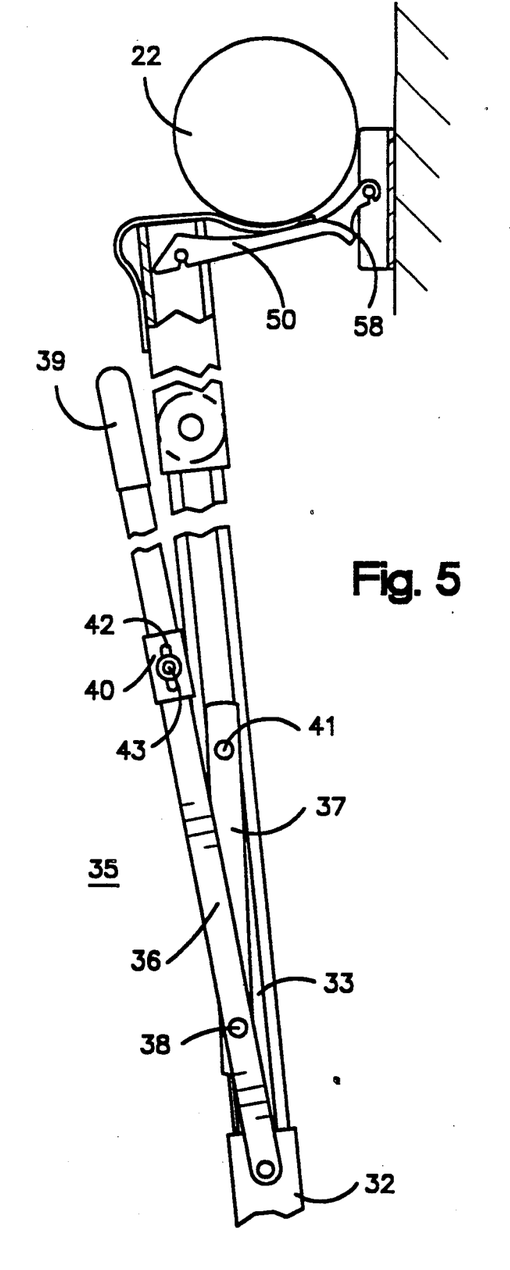
FIG. 5 is an enlarged side view showing a stored tension rafter supporting the center of the roller tube of the awning.

The central arm 33 is held to the outer arm by a tensioning arrangement 35, more clearly shown in the enlarged view of FIGS. 4 and 5, comprised of a link 36 pivoted to the side of the outer arm, and a link 37 pivoted to the corresponding side of the central arm 33. The two links, are pivoted together at a pivot 38. The link 36 extends beyond the pivot 38 and is provided with a handle 39 at its free end. The links are positioned, as illustrated in FIGS. 4 and 5, to reduce the length of the tension rafter 30 as the handle is moved away from the tension rafter 30, and to extend the tension rafter 30 when the handle is moved toward the tension rafter 30. The links are dimensioned to provide a mechanical advantage so that persons of average strength can easily extend the tension rafter 30 for tensioning the awning and lifting the center of the awning. In order to hold the tensioning arrangement with the tension rafter 30 in its extended position, a clip 40 is slidably held to the side of the link 36, so that it can be moved to engage an end 41 of the link 37. The clip 40 may thus be channel shaped, with ends longer than the thickness of the link 36, so that the ends thereof can abut the sides of the end 41 of the link 37 in the tensioned position of the tension rafter 30. The center section of the clip may have a longitudinal slot 42 to guide the longitudinal sliding of the clip on the link 36, the slot 42 engaging pin 43 having an enlarged head and affixed to the side of the link 36.

Referring again to FIGS. 2 and 3, the sides of the vehicle 20 may be provided with upper and lower affixing panels 45, 46 to which brackets 47, 48 are attached by conventional means, such as screws. The upper bracket 47 is channel shaped to receive a horizontal pin 49. A link 50 is pivoted to the pin 49, and is also pivoted to a pin 51 within the inner end of the inner arm 31. The lower bracket 48 has a pair of projections 52 for receiving a horizontal pin 53. The pin 53, which is removable by the user, is adapted to engage a hole 54 in a fitting 55 mounted in the outer end of the outer arm 32. For storage of the tension rafter 30 against the vehicle, the user can thus pivot the tension rafter 30 downwardly to align the hole 54 with the holes in the projections 52, and then insert the pin 53 through the projections 52 and hole 54. Suitable conventional means may be provided (not shown) for ensuring that the pin 53 cannot be accidentally displaced from the bracket 48.

FIG. 4 illustrated the tension rafter 30 in its lower position, with the lower end thereof held to the bracket 48, and before it has been extended to raise the center of the roller. At this position, the handle 39 of the tensioning arrangement 35 has been moved away from the tension rafter 30, the clamp 43 loosened, and the inner arm lifted upwardly so that the generally curved upper surface 58 of the link 50 just engages the roller 22 (which had been moved by the arms 24 against the vehicle). At this time, for storage of the roller, the clamp 34 is tightened to hold the inner arm 31 to the central arm 33. Then, as illustrated in FIG. 5, the handle is pushed toward the vehicle to cause the surface 58 of the link 50 to push the center of the roller upwardly, to thereby firmly support the center thereof from sagging. Since the tensioning arrangement 35 provides a mechanical advantage, this storage of the awning may be effected easily by persons of average strength. After so raising the roller, the clip 40 is preferably slid to engage the end 41 of the link 37, thereby preventing release of the tensioning arrangement 35.

THE TENSION RAFTER IN THE EXTENDED POSITION

Figure 6:
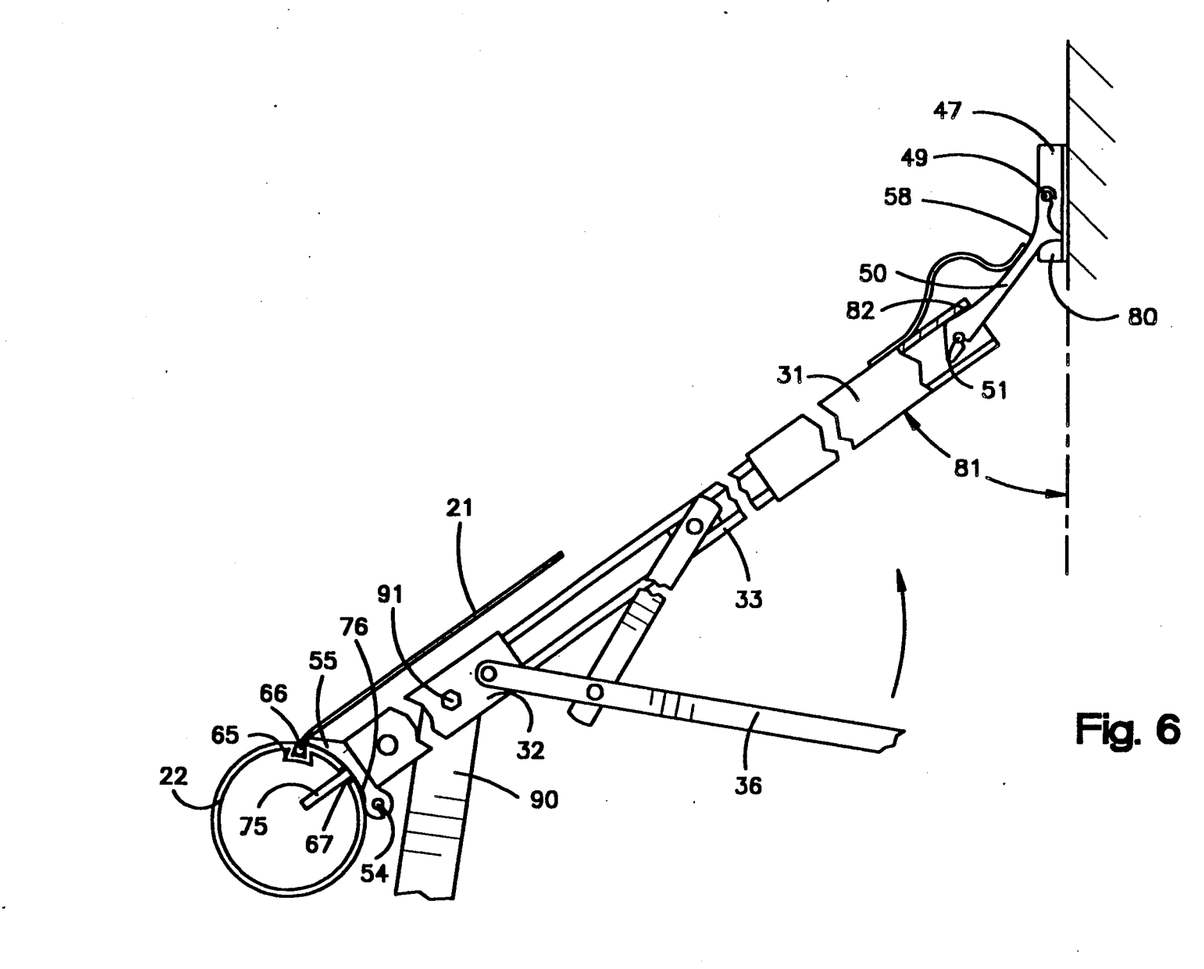
FIG. 6 is a partially cross sectional side view of the tension rafter in a lower position.

As illustrated in FIG. 6, a roller 22 for a vehicle awning is conventionally comprised of an aluminum tube having one or more longitudinal grooves 65 for receiving a spline 66 to hold the awning fabric to the roller. When the awning is initially extended from the storage position, by pivoting of the end arms 24 and extending of the end rafters 23 to engage the outer ends of the arms 24, the roller 22 is positioned at its lowermost position. At this position, since roller will normally be still angularly locked with respect to the end arm 24, the fabric will extend from the groove 65 of the roller to the vehicle.

In accordance with the invention, a hole 67 is provided in the roller, spaced from the groove 65, for example, about one inch. The fitting 55 has a pin 75 extending generally longitudinally of the tension rafter 30 and adapted to be received by the hole 67, as illustrated. The fitting 55 further has a curved surface 76 adjacent the base of the pin 75, the curved surface 76 being preferably shaped to snugly fit against the outer surface of the roller 22 as illustrated. The fitting further has an end pivot 77 spaced from the pin 75, and adapted to engage the surface of the roller immediately adjacent the groove 65, i.e. so that the end pivot 77 lies just under the line along which the fabric joins the roller.

Figures 7, 8:
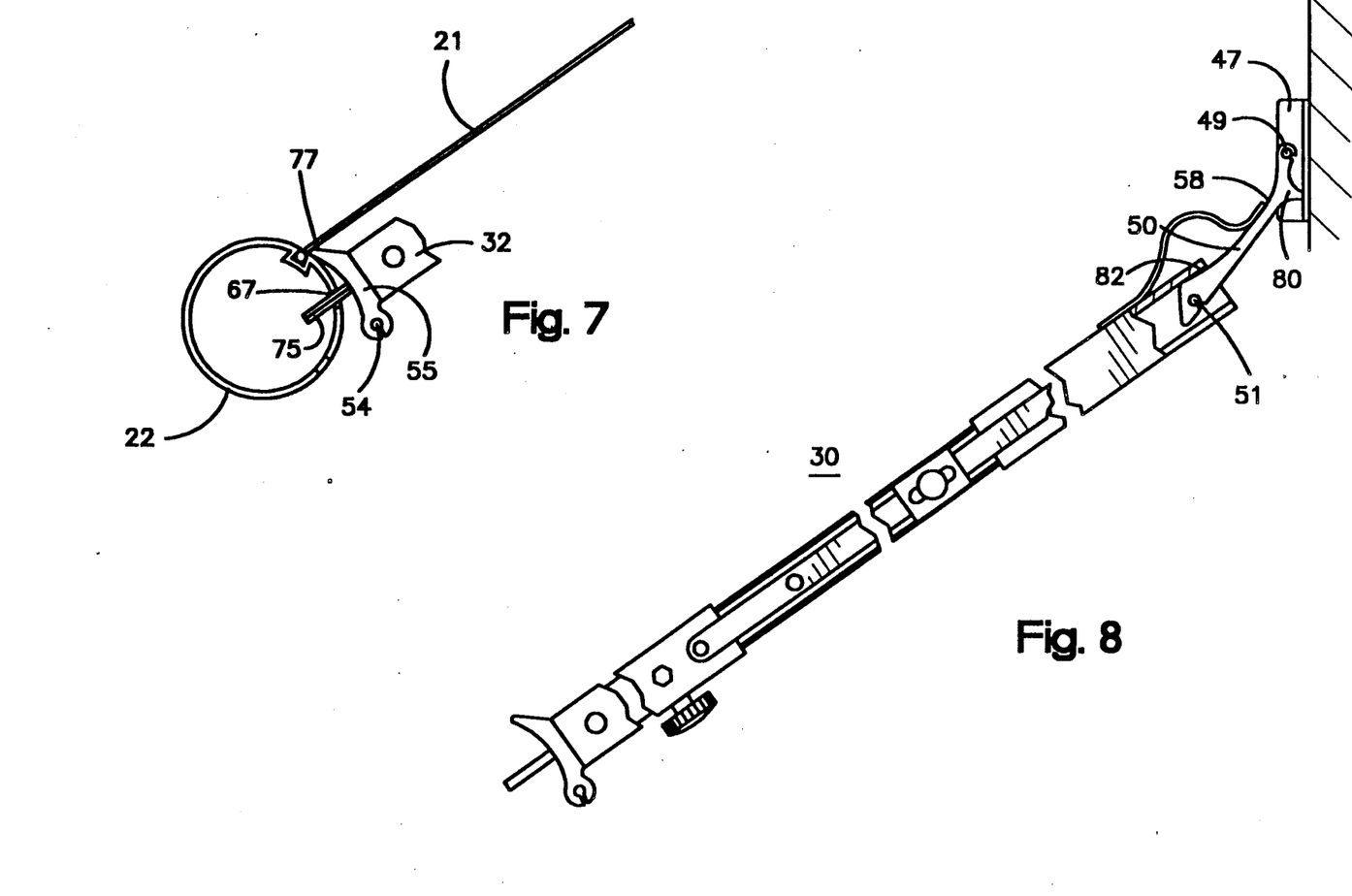
FIG. 7 illustrates a detail of the connection between the tension rafter and the roller tube, with the roller tube rotated away therefrom.
FIG. 8 is a side view of the tension rafter in a raised position.

This angular relationship between the tension rafter 30 and the roller will be generally maintained at other positions of the awning, as long as either the lower end of the end arm 24 remains held to the side of the vehicle, or the roller is unlocked to be able to roll independently of the position of the arm 24. If the user fails to release the lock holding the angular displacement of the roller 22 fixed with respect to the arm 24, however, upon release of the arm 24 from the side of the vehicle, to form a vertical support for the awning, the roller will rotate with respect to the tension rafter 30, as seen in FIG. 7. In this case, it is seen that the roller 22 pivots about the end pivot, the lower portion of the roller thereby being moved outwardly from the curved surface 76. The end pivot 77 thus maintains the distance between the vehicle and the position at which the awning 21 meets the roller, so that the tension of the awning is maintained even though the roller has been rotated. While this rotation of the roller is not desired, generally occurring upon failure of the user to release the roller catch, it does not present an unsafe condition since the pin 75 is sufficiently long to firmly position the tension rafter 30 on the roller 22.

Referring again to FIG. 6, the tension rafter 30 is illustrated in its lowermost extended position, defining an angle 81 with plane of the side of the vehicle 80. The inner link 50 has a projection 80 adapted to abut the base of the upper bracket 47 at this angular displacement, so that the link 50 is maintained at this position for lower angular displacements of the tension rafter 30. This permits the tension rafter 30 to be pivoted to lower positions for storage against the side of the vehicle, as discussed above, while maintaining the upper end thereof space from the vehicle to permit the upper surface 58 to support the roller. The open side of the channel shaped inner arm 31 faces downwardly to permit the pivoting of the tension rafter 30, as illustrated in FIG. 4.

As further illustrated in FIG. 6, when the tension rafter 30 extends at the angle 81 corresponding to the lower position of the awning, the upper surface portion 82 thereof adjacent the pivot pin 51 abuts the inner surface of the channel shaped inner arm 31, thereby preventing further angular displacement between the tension rafter 30 and the link 50 as the tension rafter 30 is rotated upwardly for higher positions of the awning. At such higher positions, as illustrated in FIG. 8, the projection 80 has pivoted away from the bracket 47. Such pivoting of the link 50 away from the side of the vehicle, whereby the tension rafter 30 pivots about th axis of the pin 49 for all extended positions of the awning, enables the inner pivot of the tension rafter 30 to be as close as possible to the junction between the awning fabric and the side of the vehicle. Since the inner pivot of the tension rafter 30 is as close as possible to the attachment line of the awning fabric, and since the end pivot of the fitting 55 at the outer end of the tension rafter 30 is as close as possible to the junction between the awning fabric and the roller 22, the tension rafter 30 in accordance with the invention maintains a substantially constant tension in the awning fabric, independently of the height to which the awning is adjusted, and independently of the possible rotation of the roller due to failure to release a lock preventing rotation of the roller with respect to the end arm 24.

In order to employ the tension rafter 30 of the invention, after raising of the awning to its lower position by the end arms 24 and connecting the end rafters 23 thereto, it is necessary to lower the center of the roller by releasing the tensioning arrangement 35, and to release the lower end of the tension rafter 30 from the bracket 48, by withdrawing the pin 53 (FIG. 3). The clamp 34 may also be released at this time. The tension rafter 30 is then pivoted upwardly, and the pin 75 of the fitting inserted in the hole 67 of the roller. Since the clamp 34 is released, the tension rafter 30 can be manually extended until the curved surface 76 of the fitting abuts the roller. The clamp 34 may now be clamped, and the tensioning arrangement 35 operated to tension the awning, by pushing the handle 39 upwardly until it is in line with the tension rafter 30. The clip may now be slid over the end 41 of the link 37 to ensure that this position of the tensioning arrangement 35 is maintained.

These steps of tensioning the awning are effected with the awning at its lowermost position, at which the tensioning arrangement 35 is easily accessible. Further tensioning of the center of the awning is not necessary, since the tension rafter 30 of the invention maintains the tension thereof independently of the height of the awning.

THE GROUND SUPPORT POLE

Figures 9, 10:
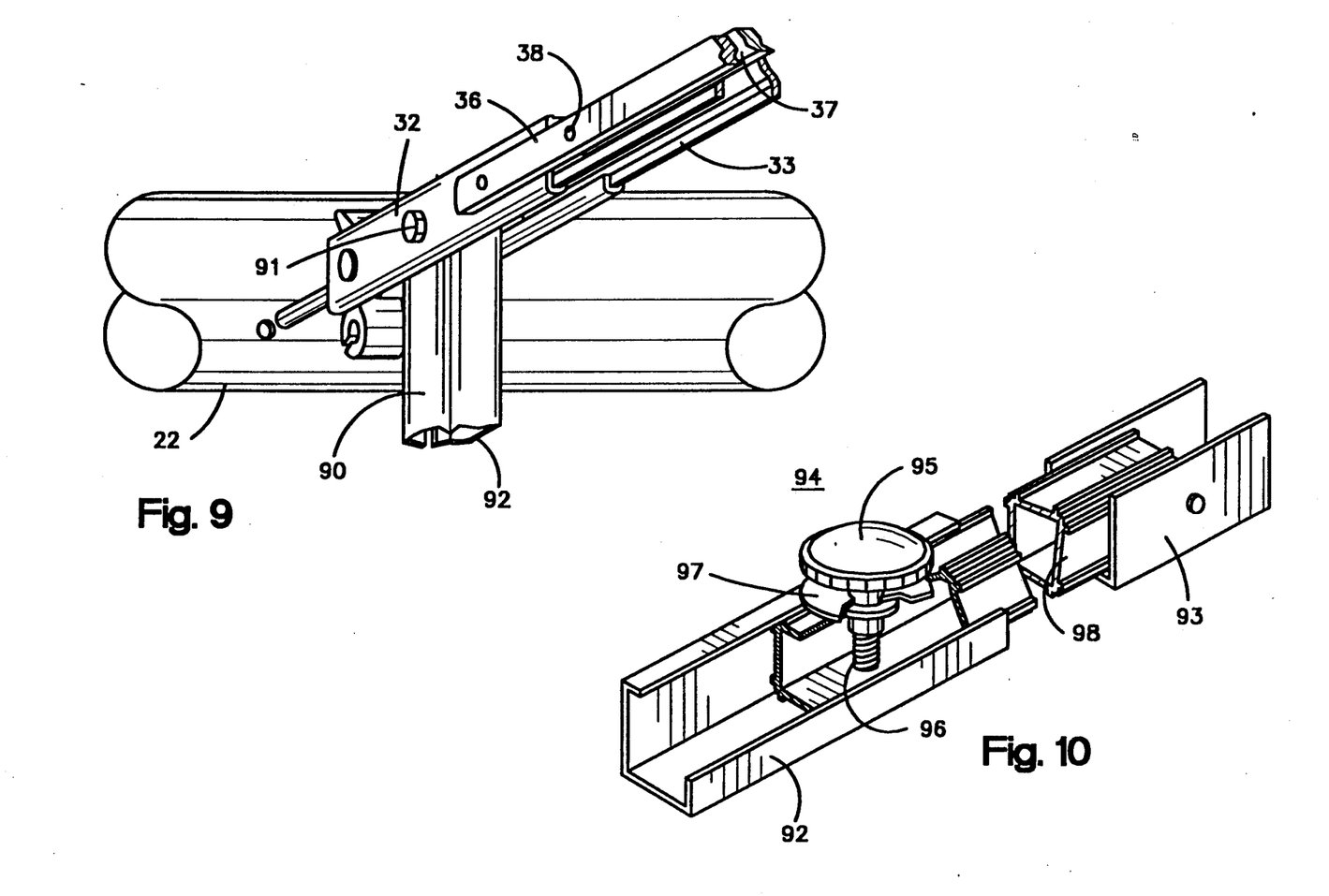
FIG. 9 is a perspective view of the junction between the tension rafter and the roller tube.
FIG. 10 is a perspective cut away view of a portion of the ground support pole.
Figure 11:
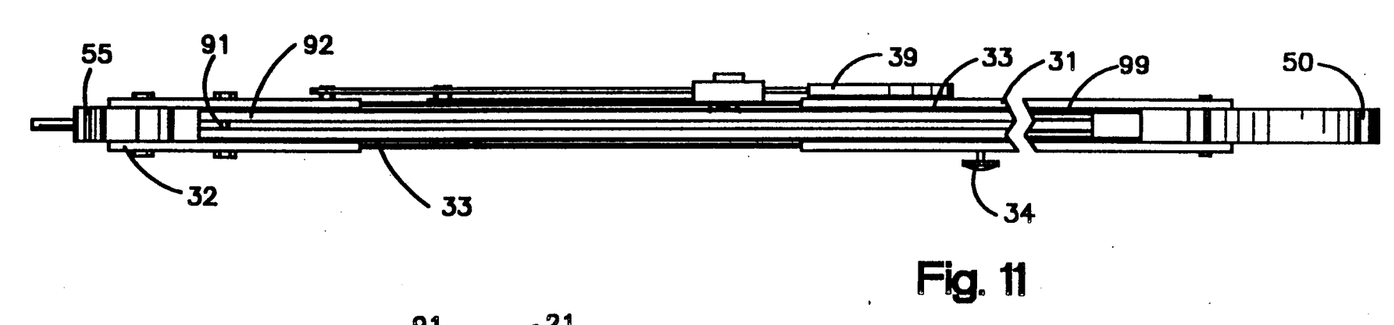
FIG. 11 is a bottom view of the tension rafter.

The tension rafter in accordance with the invention may also incorporate a ground support pole 90 pivoted on a pivot bolt 91 extending through the outer arm 32, as illustrated in FIGS. 6 and 9. The support pole 90 includes an upper channel 92 pivoted by the pivot bolt at a position close to the roller tube, the channel having an open bottom and being adapted to be pivoted to vertical position as illustrated in FIGS. 6 and 9, and to fit within the members forming the tension rafter 30, as illustrated in FIG. 11. As shown in FIG. 10, the ground support pole further includes an extensible pole 98 slidably fit within the channel 92, and a channel shaped foot 93 pivoted to the free end of the pole 98. The combined length of the channels 92 and 93 of the pole 98 may be adjusted by a clamping arrangement 94, so that the support pole can be adjusted to provide a ground support for the center of the roller 22. The clamping arrangement may include a knob 95 having a shaft 96 threaded in the wall of the pole 98, the knob being adapted to force a nylon washer 97 against the edges of the arms of the channel 92 in order to lock the pole 98 from sliding with respect to the channel 92.

Figure 12:
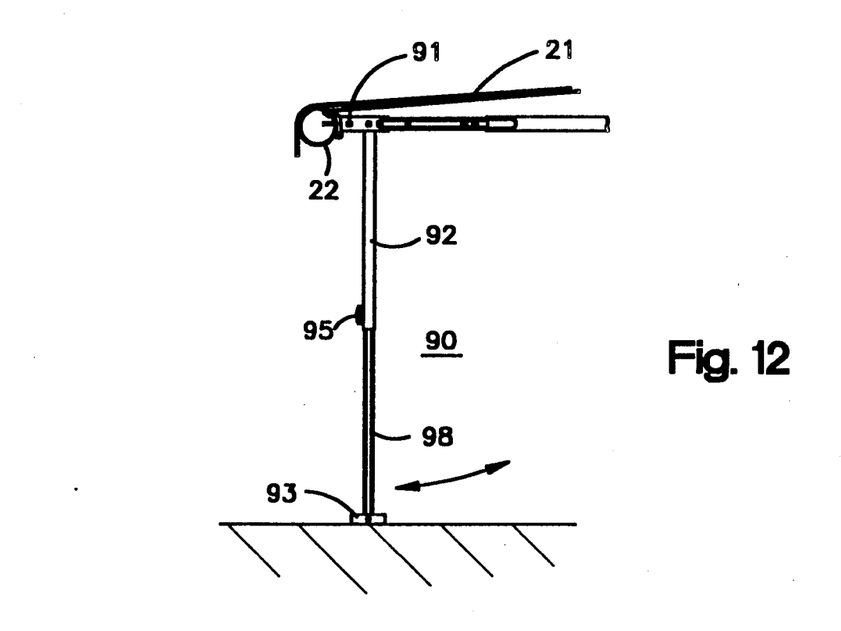
FIG. 12 is a simplified illustration showing the ground support pole pivoted to contact the ground.

As illustrated in FIG. 12, in order to provide an intermediate support for the roller tube 22, the ground support pole 90 may be pivoted downwardly and adjust in length, and the foot 93 pivoted about the bottom of the support pole 98, so that the side of the foot 93 engages the ground.

Figure 13:
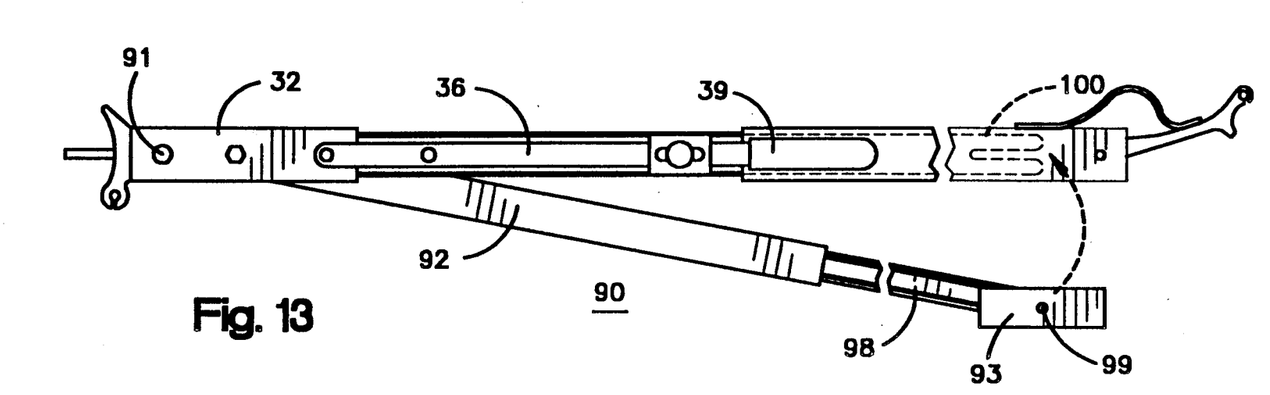
FIG. 13 is a side view illustrated the storage of the ground support pole in the tension rafter.

Referring now to FIGS. 11 and 13, the ground support pole may be pivoted, for storage within the tension rafter, by aligning the channel cross section foot 93 with the support pole, and urging it into the inner arm 33. The pivot pin 99 holding the foot 93 to the pole 98 extends laterally beyond the sides of the foot and the inner end of the central arm 33 is provided with a longitudinal slot 100 for receiving the projecting ends of the pin 99. Accordingly, in order to store the ground support pole, the clamping arrangement 94 is loosened and the support pole extended until the pin 99 is positioned beyond the end of the central arm 33. The foot 93 is then pivoted to a position within the inner arm 31. The ground support pole 90 is now shortened so that the ends of the pin 99 slide into the slot 100, to prevent pivoting of the ground support pole 90 away from the inside of the tension rafter. The clamping arrangement 94 may now be tightened to ensure that ground support pole remains within the tension rafter.

Figure 14:
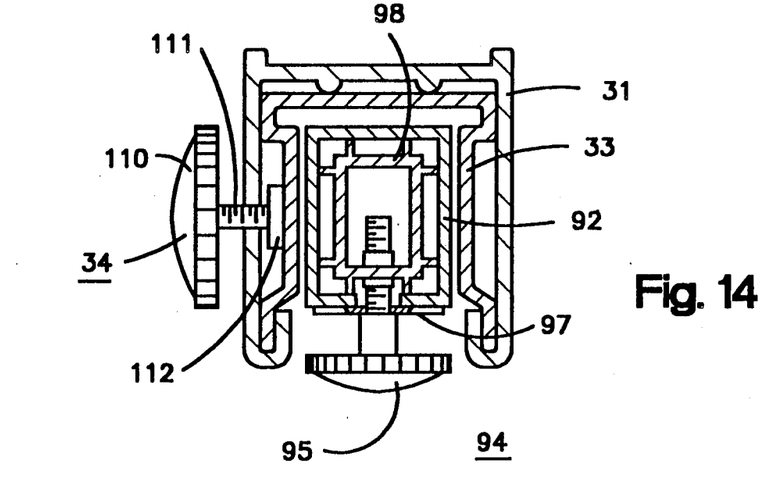
FIG. 14 is a cross sectional view of the clamping arrangements for the tension rafter.

One clamping arrangement 34 that may be employed to adjustably hold the inner arm 31 to the central arm 33 is illustrated in FIG. 14. As illustrated, a knob 110 has a threaded shaft 111 that is threaded in the sidewall of the inner arm 31. The inner end of the shaft 111 supports a friction stop 112 that is positioned to engage the sidewall of the central arm 33 when the knob 110 is rotated to clamp the inner and central arms together. When thus tightened, the stop 112 inhibits relative movement between the two arms. FIG. 14 also shows the clamping arrangement 94 for the ground support pole.

Thus, in accordance with the invention, the two ends of the tension rafter are located as close as possible to the connection points of the fabric. At the inner end, this is effected by the link which, when the rafter is raised, is prevented from pivoting beyond a given angle. Pivotal movement of the link is required at lower angles in order to permit the use of the rafter in raising and holding the center of the roller during storage. The link thus serves to provide a surface that can be raised to support the roller, but also to maintain the length of the rafter at the various angles of the rafter when the awning is extended.

Considering the outer end of the rafter, a tip thereon extends as close as possible to the joint of the fabric. As a consequence, rolling of the roller will not vary the tension of the fabric, i.e. the extended fabric length and the rafter length are constant. If the roller is not free to roll, but is held rotationally fixed with respect to the side arm, there can be an effective rolling of the roller, with respect to the tension rafter, since the pivot of the side arm is at a much lower position on the vehicle. Accordingly, the pin on the end fitting fits into a hole in the side of the roller, e.g. about 1 inch below the fabric joint. If the roller can roll, the curved end of the fitting abuts the roller, and the pin extends fully into the hole. If the roller is forced to roller with the side arm, however, the pin is withdrawn to a degree from the hole, but it maintains the angular position at which the tip abuts the roller, so that the roller "pivots" about the tip, to hold the connection line of the fabric at the same distance from the vehicle as it had previously. Accordingly, the rolling of the roller effects the moving of its axis, in the region of the tension rafter, away from the connection line between the fabric and the vehicle. The pin is long enough so that the rafter does not drop off the roller. The spaced tip and pin are thus adapted to engage the roller at spaced angular positions, with the pin being slidably received in the hole.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. An awning system comprising a wall, an awning having parallel edges and ends, means connecting one edge of said awning to said wall, an elongated roller having ends and connected to the other edge of said awning, end rafters connected to the ends of said roller operating to support said roller for movement from a storage position adjacent said wall and an extended position spaced from said wall, and extendible tension rafter means including first and second telescoping members and a link pivotally connecting to one end of said first member by a first pivot, said link also providing a second pivot permanently attached to said wall adjacent to said first edge, said extendible tension rafter means being intermediate the ends of said awning, the other end of said tensioning rafter means providing a releasible connection selectively connectable with said wall and with said roller intermediate the ends of said roller, extension of said extendible rafter means when said releasible connection is connected to said wall and when said roller is in said storage position causing said link to engage said roller and operating to raise and support said roller intermediate said ends of said roller, extension of said extendible rafter means when said releasible connection is connected to said roller and when said roller is in said extended position operating to tension said awning intermediate the ends of said awning.

2. An awning system comprising an awning connected along a first edge to a wall and along an opposite second edge connected to a support, said support being movable between an etended position spaced from said wall and a storage position adjacent to said wall, an extensible rafter, pivot means pivoting on end of said rafter to said wall, connector means releasibly connecting the other end of said rafter to said support, said pivot means enabling pivoting of said rafter to a position with said connector means adjacent said wall, said connector means releasibly connecting to said wall, said pivot means including a link pivoted to said one end of said rafter for pivotal movement about a first axis and means for pivoting said link to said wall for pivotal movement about a second axis, said link providing a curved surface, extension of said rafter while said rafter is positioned adjacent to said wall and said connector means is connected to said wall causing said curved surface of said link to move into engagement with said support and operating to raise said support relative to said wall, said connecting means including a fitting having a pin adapted to be received in a hole in said support, and a pivot surface adapted to engage said support at a position spaced from a distal end of said pin, whereby said support can rotate with respect to said rafter about said pivot surface without releasing said pin from said hole.

3. The tension rafter arrangement of claim 2 wherein said extensible rafter comprises first and second slidably intercoupled arms, means for holding said arms immovable with respect to one another, and a tensioning mechanism having a mechanical advantage for urging said arms in a direction to lengthen said rafter.

4. The tension rafter arrangement of claim 2 wherein said fitting has a curved surface between said pin and pivot surface that conforms to the surface of said support.

5. The tension rafter arrangement of claim 4 wherein said support comprises a roller tube.

6. An awning system comprising an awning connected along a first edge to a wall and along an opposite second edge connected to a support, said support being movable between an extended position spaced from said wall and a storage position adjacent to said wall, an extensible rafter, pivot means pivoting one end of said rafter to said wall, connector means releasibly connecting the other end of said rafter to said support, said pivot means enabling pivoting of said rafter to a position with said connector means adjacent said wall, said connector means releasibly connected to said wall, said pivot means including a link pivoted to said one end of said rafter for pivotal movement about a first axis and means for pivoting said link to said wall for pivotal movement about a second axis , said link providing a curved surface, extension of said rafter while said rafter is positioned adjacent to said wall and said connector means is connected to said wall causing said curved surface of said link to move into engagement with said support and operating to raise said support relative to said wall, said extensible rafter including first and second channel-shaped arms, a first lever with one end pivoted on said second arm, a handle on the other end of said lever, and a second lever pivoted to said first arm and pivoted to said first lever at a point between said handle and said one end of said first lever.

7. An awning system comprising an awning connected along a first edge to a wall and along an opposite second edge connected to a support, said support being movable between an extended position spaced from said wall and a storage position adjacent to said wall, an extensible rafter, pivot means pivoting one end of said rafter to said wall, connector means releasibly connecting the other end of said rafter to said support, said pivot means enabling pivoting of said rafter to a position with said connector means adjacent said wall, said connector means releasibly connected to said wall, said pivot means including a link pivoted to said one end of said rafter for pivotal movement about a first axis and means for pivoting said link to said wall for pivotal movement about a second axis, said link providing a curved surface, extension of said rafter while said rafter is positioned adjacent to said wall and said connector means is connected to said wall causing said curved surface of said link to move into engagement with said support and operating to raise said support relative to said wall, said extensible rafter including first and second channel-shaped arms, and an extensible support pole pivoted to said second arm, said support pole having a foot pivoted thereto and adapted to engage the ground, the dimensions of said support pole being sufficiently small so that said support pole can be nested in said rafter, and lock means for holding said support pole in said rafter.

8. The tension rafter arrangement of claim 7 wherein said means for holding said support pole comprises end extensions on said pivot pin for said foot, and slot means in said rafter.

9. An awning system comprising a retractable awning having a first edge connected to a wall and a second opposite edge connected to an end supported roller movable to an extended position spaced from said wall and a retracted position adjacent said wall, said first edge and said roller having ends, an elongated extensible rafter having ends, a first pivot pivotally connecting one end of said rafter to said wall adjacent to said first edge and intermediate the ends of said first edge of said awning, a releasible connection at the other end of said rafter for releasibly connecting said other end of said rafter to said wall at a location remote from said first edge of said awning, and for releasibly connecting said other end of said rafter to said roller intermediate the ends of said roller, said rafter being pivotable about said first pivot between a support position in which said releasible connection is connected to said wall and a tensioning position in which said releasible connector is connected to said roller, extension of said rafter in said support position raising and supporting said roller intermediate said ends of said roller, extension of said rafter in said tensioning position tensioning said awning intermediate the ends of said roller, said rafter including first and second telescoping members and a link pivotally connecting to one end of said first member by a second pivot, said link also providing said first pivot, extension of said telescoping members when said assembly is in said support position causing said link to pivot around said first pivot up against said roller to raise and support said roller, said rafter also including a leg nested in said first and second telescoping members in a stored position and pivotable relative to said second member to an extended position for engagement with a supporting surface.

* * * * *

UNITED STATES PATENT AND TRADEMARK OFFICE
CERTIFICATE OF CORRECTION

PATENT NO. : 5,094,285

DATED : March 10, 1992

INVENTOR(S) : Brent Murray

It is certified that error appears in the above-identified patent and that said Letters Patent is hereby corrected as shown below:

Column 3, line 13, delete "no" and insert therefor --now--;

Column 5, line 27, after "links" delete "," (comma);

Column 5, line 47, after "engaging" insert --a--;

Column 7, line 28, delete "th" and insert therefor --the--;

Column 9, Claim 2, line 68, delete "etended" and insert therefor --extended--.

Signed and Sealed this

Twenty-eighth Day of September, 1993

Attest:

BRUCE LEHMAN

*Attesting Officer*   *Commissioner of Patents and Trademarks*